United States Patent
Henneböle et al.

(10) Patent No.: US 9,366,406 B2
(45) Date of Patent: Jun. 14, 2016

(54) SPACE SAVING LIGHTING DEVICE FOR VEHICLES

(71) Applicant: Hella KGaA Hueck & Co., Lippstadt (DE)

(72) Inventors: Klaus Henneböle, Büren-Steinhausen (DE); Markus Vogt, Lippstadt (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 95 days.

(21) Appl. No.: 14/282,913

(22) Filed: May 20, 2014

(65) Prior Publication Data
US 2015/0078023 A1 Mar. 19, 2015

(30) Foreign Application Priority Data
May 21, 2013 (DE) .......................... 10 2013 105 153

(51) Int. Cl.
| | |
|---|---|
| F21V 9/00 | (2015.01) |
| F21S 8/10 | (2006.01) |
| B60Q 1/00 | (2006.01) |
| B60Q 1/26 | (2006.01) |
| F21V 8/00 | (2006.01) |

(52) U.S. Cl.
CPC ........... *F21S 48/2225* (2013.01); *B60Q 1/0058* (2013.01); *B60Q 1/2607* (2013.01); *F21S 48/2243* (2013.01); *F21S 48/2268* (2013.01); *F21S 48/2281* (2013.01); *F21S 48/234* (2013.01); *F21S 48/238* (2013.01); *F21S 48/24* (2013.01); *G02B 6/0053* (2013.01); *G02B 6/0065* (2013.01)

(58) Field of Classification Search
CPC . B60Q 1/0058; B60Q 1/2607; F21S 48/2225; F21S 48/2243; F21S 48/2268; F21S 48/238; F21S 48/24; F21S 48/234; F21S 48/2281; G02B 6/0053; G02B 6/0065
USPC .......................................................... 362/511
See application file for complete search history.

(56) References Cited

U.S. PATENT DOCUMENTS

2012/0140481 A1* 6/2012 Simchak .................. F21K 9/52
362/296.07

FOREIGN PATENT DOCUMENTS

| DE | 10200359 A1 | 7/2003 |
|---|---|---|
| DE | 102004054732 A1 | 5/2006 |
| DE | 102005035066 A1 | 2/2007 |
| DE | 202010006217 U1 | 9/2010 |
| DE | 102011084270 A1 | 4/2013 |

* cited by examiner

*Primary Examiner* — Bao Q Truong
*Assistant Examiner* — Hana Featherly
(74) *Attorney, Agent, or Firm* — Husch Blackwell LLP

(57) ABSTRACT

A lighting device that is designed for vehicles and that comprises a first light emitting unit for generating a first light function and a second light emitting unit for generating a second light function. The second light emitting unit has a flat light guide having a narrow side at the light input face for coupling light into the flat light guide, as well as opposing flat sides. The flat light guide has a rear flat side, which is arranged rearwards seen in the main direction of emission, and a front flat side, which is arranged forwards seen in the main direction of emission. Output elements and/or a reflecting face are associated with the rear flat side of the flat light guide in a light output section of said flat light guide. The flat light guide comprises a light passage section, in which no output elements and no reflecting face are associated with the rear flat side. The reflecting face in the light output section of the flat light guide is integrally molded on the rear flat side of said flat light guide.

10 Claims, 1 Drawing Sheet

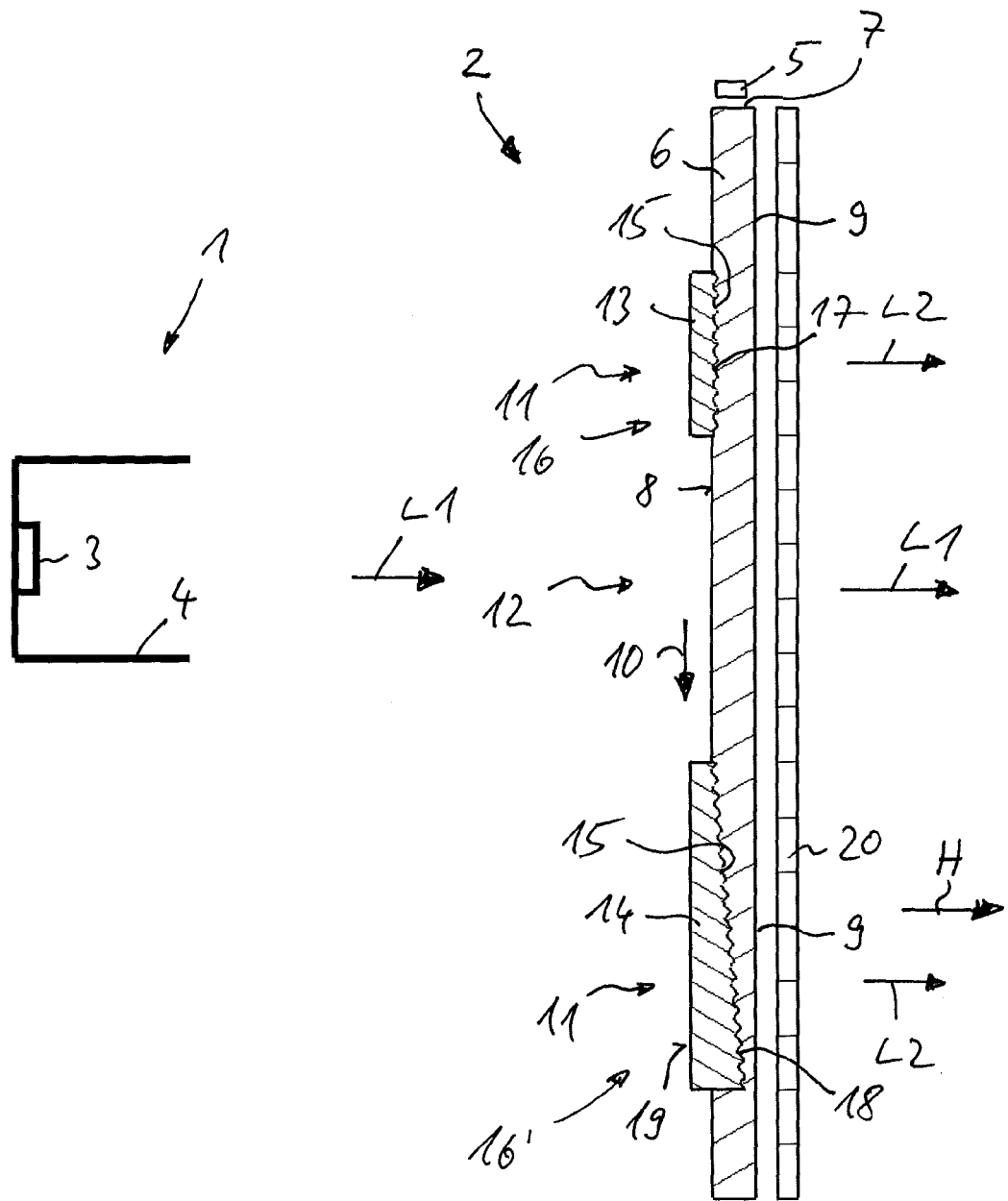

SPACE SAVING LIGHTING DEVICE FOR VEHICLES

CROSS REFERENCE

This application claims priority to German Patent Application No. 10 2013 105153.7 filed May 21, 2013, and hereby incorporates this document by reference.

FIELD OF THE INVENTION

The invention relates to a lighting device that is designed for vehicles and that comprises a first light emitting unit for generating a first light function and a second light emitting unit for generating a second light function, wherein the second light emitting unit has a flat light guide having a narrow side at the light coupling in face (light input face) for coupling light into the flat light guide and opposing flat sides, to which the input light can be passed by means of total reflection in the light guiding direction; that the flat light guide has a rear flat side, which is arranged rearwards seen in the main direction of emission, and a front flat side, which is arranged forwards seen in the main direction of emission; that output elements and/or a reflecting face are associated with the rear flat side of the flat light guide in a light coupling out section (light output section) of the said flat light guide, in order to deflect the input light in the direction of the front flat side, at which the light can be coupled out in the main direction of emission; that the flat light guide comprises a light passage section, in which no output elements and no reflecting face are associated with the rear flat side, so that a light bundle that is radiated from the second light emitting unit that is arranged behind the flat light guide in the main direction of emission is guided through the flat sides of the light passage section in the main direction of emission.

Furthermore, the invention relates to a flat light guide for such a lighting device.

BACKGROUND

DE 20 2010 006 217 U1 discloses a lighting device that is designed for vehicles and that provides a first light emitting unit for generating a first light function and a second light emitting unit for generating a second light function. The second light emitting unit has a flat light guide that has opposing flat sides, to which the input light is passed by a narrow side at the light coupling in face (light input face) in the light guiding direction. The flat light guide has a plurality of light coupling out sections (light output sections) in the light guiding direction; and in these light output sections there are output elements that are arranged on a flat side, which is arranged in the rear seen in the main direction of emission. This arrangement has the effect that the input light that impinges on said output elements is deflected in the direction of the front flat side and can be coupled out at said front flat side. Furthermore, the flat light guide has a plurality of light passage sections, in which no output elements are arranged, so that light radiated from the first light emitting unit can pass through the flat light guide. The rear flat side is assigned a support disk, which has reflecting faces in the light output section, so that the light passing through the rear flat side is reflected back in the direction of the flat light guide and, as a result, is not lost for the second light function. The drawback with this design is that the continuous design of the support plate for the reflecting face causes transmission losses when the first light emitting unit is operating. If the first light emitting unit has an incandescent lamp as the light source, then the result is a higher thermal load.

DE 10 2006 016 656 A1 discloses a lighting device that is designed for vehicles and that comprises a flat light guide having a flat side, which is arranged in the rear seen in the main direction of emission. Said rear flat side has a plurality of output elements that have the effect of deflecting the input light in the direction of the front flat side. These output elements are, as in the case of the aforementioned document, an integral part of the rear flat side.

SUMMARY OF THE INVENTION

The object of the present invention is to further develop a lighting device that is designed for vehicles and that comprises a first light emitting unit and a second light emitting unit, which comprises a flat light guide, in such a way that space-saving and planar radiation from at least two light functions is guaranteed at a low cost of production, and at the same time a high efficiency and a homogenous appearance is produced.

In order to achieve this engineering object, the invention is characterized in connection with the preamble of patent claim 1 in that the reflecting face in the light output section of the flat light guide is integrally molded on the rear flat side of said flat light guide.

The particular advantage of the invention lies in the fact that it is possible to dispense with an additional support disk for receiving reflecting faces. According to the invention, reflecting faces are integrally molded on a rear flat side of a flat light guide in a region, in which they are needed. Since a support disk is not arranged in a light passage section of the flat light guide, transmission losses are avoided during transmission of the light of the first light emitting unit through the flat light guide.

According to a preferred embodiment of the invention, the reflecting face is formed by an injection molded element, which is injection molded directly on a rear flat side of the flat light guide in a joining area to the flat light guide. The advantage gained by the injection molding process is a homogeneous appearance of the second light emitting unit that is formed in this way, because the net result is that the light that is coupled into the flat light guide is reflected in a diffuse manner.

According to a further development of the invention, the injection molded element and/or the rear flat side of the flat light guide is and/or are formed in a profiled manner on a joining side that faces each other. The advantage here is that both a plurality of output elements and a reflecting face are formed on the joining side. Since the reflecting face directly abuts the rear flat light side, the light that is coupled into the flat light guide is prevented from leaving at the rear flat side.

According to a further development of the invention, the joining sides of the injection molded part and of the rear flat side are designed in the shape of a prism so that they mate while simultaneously making flat contact. This arrangement has the advantage that not only the light that impinges on the joining side is reflected, but also, in addition and beyond this feature, the light is also deflected in a targeted way.

According to a further development of the invention, the injection molded element is made of a diffusely reflective material, for example, a material that is colored white.

According to a further development of the invention, the rear flat side in the light output section has an indentation, in which the respective injection molded element is integrally molded at least in part. The advantage of this feature is that the total thickness of the light forming unit that is formed by the flat light guide and the injection molded elements can be defined.

In order to achieve the engineering objective, the invention comprises a flat light guide.

The flat light guide is advantageously constructed in one piece, as a result of which it comprises, on the one hand, output elements and, on the other hand, reflecting faces.

Additional advantages of the invention are apparent from the additional dependent claims.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 1: a vertical sectional view of a lighting device.

DETAILED DESCRIPTION

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

A lighting device can be disposed in a front nose or tail area of a vehicle. Said lighting device comprises a first light emitting unit 1 for generating a first light function and a second light emitting unit 2 for generating a second light function in a housing that is not illustrated.

The first light emitting unit 1 comprises a first light source 3 and a reflector 4 as the light conducting means. The light L1 that is radiated from the first light emitting unit 1 is radiated in a main direction of emission H, in order to generate, for example, a brake light function.

The second light emitting unit 2 comprises a second light source 5 as well as a flat light guide 6. In this case the flat light guide 6 is arranged more or less perpendicular to the main direction of emission H. The flat light guide 6 has a narrow side at the light input face 7 that faces the second light source 5; and the light that is radiated from the second light source 5 is coupled into the flat light guide 6 at said light input face. Furthermore, the flat light guide 6 has opposing flat sides 8, 9, at which the input light is totally reflected in the light guiding direction 10.

The flat light guide 6 has a plurality of light output sections 11, in which the input light is deflected in such a way that it is coupled out as a light bundle L2 at a front flat side 9 of the flat light guide 6 in the main direction of emission H, in order to generate the second light function. In this way it is possible to generate, for example, a taillight function.

Furthermore, the flat light guide 6 comprises a light passage section 12, in which there are no light deflecting means (output elements, reflecting face), so that the light bundle L1 that is emitted from the first light emitting unit 1 can pass through the flat sides 8, 9 of the flat light guide 6. The front flat side 9 and a rear flat side 8 of the flat light guide 6 are designed in the light passage section 12 in such a way that they are preferably smooth or more specifically planar.

Injection molded elements 13, 14 are integrally molded on the rear flat side 8 in the light output sections 11 of the flat light guide 6. The injection molded elements 13, 14 are made of a material that has the effect of reflecting in a diffuse manner when light impinges on said injection molded elements. For example, the material of the injection molded elements 13, 14 can be made of a material that is colored white and/or can be made of a translucent material. The injection molded element 13, 14 is designed in the shape of strips and/or sheets. In this case a joining side 15 that faces the rear flat side 8 forms a reflecting face for the light that is coupled into the flat light guide 6 by means of the second light source 5.

The flat light guide 6 is made of a crystal clear or more specifically transparent plastic material or glass material. The injection molded elements 13, 14 are joined in one piece to the flat light guide 6 in a joining area 16, 16'. The injection molded elements 13, 14 can be joined to the flat light guide 6, for example, by means of a two component injection molding process.

The joining side 15 that is a part of the injection molded elements 13, 14 and that faces the rear flat side 8 is designed in such a way that it is profiled, like the rear flat side 8 in the light output section 11. In the present exemplary embodiment both the joining side 15 of the injection molded element 13, 14 and the rear flat side 8 in the light output section 11 are designed in the shape of a prism. The prism-shaped profiling of the rear flat side 8 is used to mold the output elements, by means of which the input light of the second light source 5 that impinges on said output elements is deflected in the direction of the front flat side 9.

In the joining area 16, in which the one injection molded element 13 may be found, prism-shaped output elements 17 of the rear flat side 8 extend in the extension direction of the flat light guide 6 or more specifically in the light guiding direction 10. The profiling of the joining side 15 of the injection molded element 13 extends in an analogous manner.

In a joining area 16', in which the other injection molded element 14 may be found, prism-shaped output elements 18 of the rear flat side 8 extend at an angle to the extension direction of the flat light guide 6 or more specifically at an angle to the light guiding direction 10. In this joining area 16' the rear flat side 8 forms an indentation with an inclined base, from which the distance to the front flat side 9 decreases in stages in the light guiding direction 10. Correspondingly the cross section of the other injection molded element 14 is designed in the shape of a wedge, so that the distance between the joining side 15 and a cover side 19 increases in stages in the light guiding direction 10.

According to an alternative embodiment of the invention that is not shown, the joining side 15 of the injection molded elements 13, 14 can also be designed in such a way that it is smooth, so that the distance between the joining side 15 and the cover side 19 of the other injection molded element 14 increases continuously in the light guiding direction 10.

Preferably an additional light disk 20, which covers the flat light guide 6, is arranged in front of the flat light guide 6 in the main direction of emission H. The additional light disk 20 can be provided partially in the area of the light output section 11 or continuously with optical elements that are produced by eroding.

The first light source 3 and the second light source 5 are designed preferably as an LED light source.

LIST OF REFERENCE NUMERALS

1 first light emitting unit
2 second light emitting unit
3 first light source
4 reflector
5 second light source
6 flat light guide
7 light input face
8 rear flat side
9 front flat side
10 light guiding direction
11 light output section
12 light passage section
13 injection molded element
14 injection molded element
15 joining side
16, 16' joining area
17 output elements
18 output elements
19 cover side
20 additional light disk

The invention claimed is:

1. A lighting device that is designed for vehicles comprising:
    a first light emitting unit for generating a first light function and a second light emitting unit for generating a second light function,
    wherein the second light emitting unit has a flat light guide having a narrow side at the light input face for coupling light into the flat light guide and opposing flat sides, to which the input light is passed by means of total reflection in the light guiding direction;
    wherein the flat light guide has a rear flat side, which is arranged rearwards seen in the main direction of emission, and a front flat side, which is arranged forwards seen in the main direction of emission;
    wherein a reflecting face is integrally molded to the rear flat side of the flat light guide in a light output section of said flat light guide, in order to deflect the input light in the direction of the front flat side, at which the light is coupled out in the main direction of emission; and
    wherein the flat light guide comprises a light passage section so that a light bundle that is radiated from the second light emitting unit that is arranged behind the flat light guide in the main direction of emission is guided through the flat sides of the light passage section in the main direction of emission, wherein the reflecting face in the light output section of the flat light guide is integrally molded on the rear flat side of said flat light guide.

2. The lighting device, as claimed in claim 1, wherein the reflecting face is formed by an injection molded element, which is joined directly to the rear flat side of the flat light guide in a joining area.

3. The lighting device, as claimed in claim 2, the joining side of the injection molded element and the rear flat side of the flat light guide are designed in a profiled manner in the shape of a prism in the light output section.

4. The lighting device, as claimed in claim 2, wherein the injection molded element is made of a diffusely reflective material and that the flat light guide is made of a crystal clear material.

5. The lighting device, as claimed in claim 2, wherein the injection molded element is joined to the rear flat side of the flat light guide by means of a two component injection molding process.

6. The lighting device, as claimed in claim 2, wherein the injection molded element is flat, wherein prism-shaped output elements are arranged one behind the other in the light guiding direction.

7. The lighting device, as claimed in claim 2, wherein the cross section of the injection molded element is designed in the shape of a wedge, so that the distance of the plurality of output elements, which are arranged on the rear flat side, to the front flat side decreases continuously or in stages in the light guiding direction.

8. The lighting device, as claimed in claim 7, wherein the rear flat side in the joining area has an indentation with an inclined base, from which the distance to the front flat side decreases continuously or in stages in the light guiding direction.

9. The lighting device, as claimed in claim 1, wherein at least one of the injection molded element and the rear flat side of the flat light guide is formed in a profiled manner on a joining side that faces each other.

10. The lighting device, as claimed in claim 1, wherein the flat light guide is joined in one piece to a plurality of injection molded elements.

* * * * *